United States Patent [19]

Tomihashi et al.

[11] Patent Number: 5,171,804
[45] Date of Patent: Dec. 15, 1992

[54] FLUORINE-CONTAINING POLYMER FOR PAINTS AND PAINT COMPOSITION CONTAINING THE POLYMER

[75] Inventors: Nobuyuki Tomihashi; Ryuji Iwakiri, both of Settsu, Japan

[73] Assignee: Daikin Industries, Ltd., Osaka, Japan

[21] Appl. No.: 706,436

[22] Filed: May 28, 1991

[30] Foreign Application Priority Data

May 29, 1990 [JP] Japan .................. 2-141170
May 16, 1991 [JP] Japan .................. 3-111647

[51] Int. Cl.$^5$ .................. C08F 12/20; C08F 16/24
[52] U.S. Cl. .................. 526/247; 526/249; 526/255
[58] Field of Search .................. 526/249, 247, 255

[56] References Cited

U.S. PATENT DOCUMENTS

| | | | |
|---|---|---|---|
| 4,345,057 | 8/1982 | Yamabe et al. | 526/247 |
| 4,452,950 | 6/1984 | Wideman | 525/339 |
| 4,668,749 | 5/1987 | Graun et al. | 526/249 |

FOREIGN PATENT DOCUMENTS

| | | | |
|---|---|---|---|
| 0391232 | 10/1990 | European Pat. Off. | 526/249 |
| 61-87716 | 5/1986 | Japan | 526/249 |
| 62-292814 | 12/1987 | Japan | 526/249 |
| 63-110265 | 5/1988 | Japan | 526/249 |
| 2-151609 | 6/1990 | Japan | 526/249 |

Primary Examiner—Joseph L. Schofer
Assistant Examiner—N. Sarafim
Attorney, Agent, or Firm—Armstrong & Kubovcik

[57] ABSTRACT

A fluorine-containing copolymer for paints, having $\overline{M}n$ of 5000 to 50000 and $\overline{M}w/\overline{M}n$ of 2 to 10, which consists essentially of 30 to 70% by mole of the fluoroolefin unit, 15 to 45% by mole of the vinyl ether or vinyl ester unit, 1 to 30% by mole of the hydroxyalkyl vinyl ether unit, and 4 to 30% by mole of the carboxyl-containing unit wherein the carboxyl group is neutralized in an amount of 30% or more with ammonia or a tertiary amine. This copolymer can give a god coating film without water spots and dewetting as well as with a good levelling property, while maintaining the excellent properties which a fluorine resin has be nature.

5 Claims, No Drawings

FLUORINE-CONTAINING POLYMER FOR PAINTS AND PAINT COMPOSITION CONTAINING THE POLYMER

BACKGROUND OF THE INVENTION

The present invention relates to a fluorine-containing polymer for paints, particularly suitable for electrodeposition coating, and to a paint composition containing the polymer.

Various paint compositions containinng fluorine-containing polymers are known. As electrodeposition coating compositions, Japanese Examined Patent Publication No. 34190/1988 discloses compositions prepared by dispersing a fluorine-containing copolymer which contains a vinyl ether carboxylic acid as a monomer into water together with a curing agent.

Those electrodeposition coating compositions containing the fluorine-containing resin give coating films being excellent in weatherability, chemical resistance, stain resistance, solvent resistance and surface hardness. However, there are problems as to dewetting, water spotting or levelling property.

The object of the present invnetion is to provide a fluorine-containing polymer for paints which is improved in dewetting, water spotting and levelling property while maintaining the excellent properties of fluorine-containing paints, and also is to provide a paint composition containing the polymer.

SUMMARY OF THE INVENTION

According to the present invention, there can be provided a fluorine-containing copolymer having a number average molecular weight of 5000 to 50000 and a molecular weight distribution represented by a value of weight average molecular weight/number average molecular weight of 2 to 10, which consists essentially of a unit of the formula (I):

wherein X is chlorine atom, fluorine atom or trifluoromethyl, in an amount of 30 to 70% by mole, a unit of the formula (II):

wherein $R^1$ is an alkyl group having 1 to 12 carbon atoms, a monovalent alicyclic group having 4 to 10 carbon atoms or a fluoroalkyl group having 2 to 10 carbon atoms, and j is 0 or 1, in an amount of 15 to 45% by mole, a unit of the formula (III):

wherein k is an integer of 2 to 6, in an amount of 1 to 30% by mole, and a unit of the formula (IV):

wherein $R^2$, $R^3$ and $R^4$ are the same or different and each is hydrogen atom or a carboxyl-containing organic residue without an ester moiety, provided that at least one of $R^2$, $R^3$ and $R^4$ contains a carboxyl group, and not less than 30% of the carboxyl group is neutralized with ammonia or a tertiary amine, and $R^3$ and $R^4$ may be combined together to form a ring, in an amount of 4 to 30% by mole; a total % by mole of the units (I), (II), (III) and (IV) is 100.

The present invention also provides a paint composition comprising (A) the fluorine-containing copolymer and (B) a hydrophilic medium.

DETAILED DESCRIPTION

The fluorine-containing copolymer of the present invention has characteristics of the monomer kind, the molecular weight and the molecular weight distribution. The present inventors have found the fact that particular monomers can raise a glass transition point of a resultant polymer in comparison with the case where the vinyl ether carboxilic acid described in the Japanese Examined Patent Publication No. 34190/1988 is used, and the fact that the problems of dewetting, water spotting and levelling property can be solved by using the fluorine-containing copolymer of the particular monomers which copolymer has a number average molecular weight within the specified range and has a molecular weight distribution (weight average molecular weight/number molecular weight, hereinafter the same) within the specified range, and then the present invention has been completed.

The molecular weight distribution is particularly important. Namely, since upon electrodeposition coating a solvent is entangled in a coating film, a polymer having a sharp distribution at the lower molecular side gives a decreased microscopic roughness of the surface of the resultant coating film, and then the electrodeposition coating film has a specular surface. As a result, when draining, some water drops adhere to the surface, and the thus insufficiently drained film give undesired water spots after baking. On the other hand, a polymer having a sharp distribution at a higher molecular weight side is inferior in levelling property, and thus a good smoothness of the electrodeposition coating film is lost. Also, when the molecular weight distribution is wide, lower molecular weight polymers are embedded in a clearance between higher molecular weight polymers. As a result, the water spot tends to be produced on the obtained coated film and also, the dewetting occurs to much extent. Further, after baking, the smoothness of the coating film becomes lost due to the higher molecualr weight polymers.

Considering the above requirements, according to the present invention, the number average molecular weight and the molecular weight distribution of the fluorine-containing copolymer are limited to 5000 to 50000 and 2 to 10, respectively.

The fluorine-containing copolymer of the present invention consists essentially of the units (I) to (IV).

The unit (I) is derived from a fluoroolefin of the formula (Ia):

wherein X is as defined above. Examples of the unit (Ia) are tetrafluoroethylene (TFE), chlorotrifluoroethylene (CTFE) and hexafluoropropylene (HFP). The amount of the unit (I) is 30 to 70% by mole, preferably 35 to 65% by mole, the most preferably 40 to 60% by mole. When the amount is larger, a solvent solubility of the polymer becomes bad, and when smaller a weatherability becomes bad.

The unit (II) is derived from a vinyl ether (j=0) or a vinyl ester (j=1) of the formula (IIa):

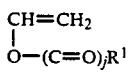
(IIa)

wherein $R^1$ and j are as defined above. The copolymer of the invention may contain the vinyl ether unit or the vinyl ester unit or both of them. Examples of $R^1$ are, for instance, an alkyl group such as methyl, ethyl, propyl, n-butyl, isobutyl, hexyl, octyl, decyl or lauryl; an alicyclic group such as cyclobutyl, cyclopentyl, cyclohexyl, adamantyl or bornyl; a fluoroalkyl group such as 2,2,2-trifluorooctyl, 2,2,3,3-tetrafluoropropyl, 2,2,3,3,3-pentafluoropropyl, 2,2,3,3,4,4,5,5-octafluoropentyl, 2,2,3,3,4,4,4-heptafluorobutyl or 2,2,3,3,4,4,5,5,6,6,7,7,8,8,9,9-hexadecafluorononyl; and the like. Examples of the monomers are, for instance, a vinyl ester such as vinyl acetate, vinyl propionate, vinyl butyrate, vinyl pivalate, vinyl capronate, vinyl laurate, vinyl Versalate® or vinyl cyclohexanecarboxylate; a vinyl ether such as methyl vinyl ether, ethyl vinyl ether, n-propyl vinyl ether, isopropyl vinyl ether, n-butyl vinyl ether, isobutyl vinyl ether, t-butyl vinyl ether, n-pentyl vinyl ether, n-hexyl vinyl ether, n-octyl vinyl ether, 2-ethylhexyl vinyl ether, cyclohexyl vinyl ether, lauryl vinyl ether, 2,2,2-trifluoroethyl vinyl ether, 2,2,3,3-tetrafluoropropyl vinyl ether, 2,2,3,3,3-pentafluoropropyl vinyl ether, 2,2,3,3,4,4,5,5-octafluoro vinyl ether or 2,2,3,3,4,4,4-heptafluorobutyl vinyl ether; and the like. Among them, vinyl pivalate and vinyl cyclohexanecarboxylate as the vinyl ester are preferably used in view of their good alkaline resistance, and the alkyl vinyl ether is more suitably used in view of copolymerizability. The unit (II) is, contained in an amount of 15 to 45% by mole. When contained in an excess amount, the obtained copolymer has a bad solubility to a hydrophilic solvent, and when contained in a smaller amount, the flexibility of the copolymer is lost. A preferable amount of the unit (II) is 25 to 45% by mole.

The unit (III) is derived from a hydroxyalkyl vinyl ether of the formula (IIIa):

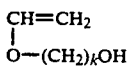
(IIIa)

wherein k is as defined above. Examples are, for instance, hydroxyethyl vinyl ether, hydroxypropyl vinyl ether, hydroxybutyl vinyl ether, hydroxypentyl vinyl ether, hydroxyhexyl vinyl ether and the like. The unit (III) is contained in an amount of 1 to 30% by mole, preferably 5 to 20% by mole. When contained in an excess amount, the boiling water resistance and the chemical resistance are lowered, and when smaller amount, the number of curing points becomes few.

The unit (IV) can endow the copolymer with a good water dispersibility and with electrodepositing portions at electrodeposition coating. The unit (IV) is contained in an amount of 4 to 30% by mole, preferably 4 to 20% by mole. The carboxyl group is neutralized with ammonia or a tertiary amine to an extent of not less than 30% by mole, preferably not less than 50% by mole of the total carboxyl group. When the unit (IV) content is contained in excess, the boiling water resistance and the chemical resistance become lowered, and when contained in a smaller amount the adhesiveness tends to be inferior, and when contained in a much smaller amount the water dispersibility becomes also inferior. When using a neutralizing agent other than ammonia or the tertiary amine, for example, a secondary amine, the obtained coating film sometimes undesirably turns to yellow.

The carboxyl-containing organic residue of the unit (IV) does not contain an ester moiety:

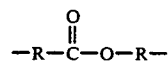

wherein R is the same or different divalent organic residue.

The preferred unit (IV) is a carboxyl-containing unit of the formula (IVa):

(IVa)

wherein l is an integer of 1 to 6, the formula (IVb):

(IVb)

wherein $R^5$ is an alkyl group having 1 to 8 carbon atoms, the formula (IVc):

(IVc)

wherein m is an integer of 1 to 12, the formula (IVd):

(IVd)

wherein n is an integer of 1 to 4, or the formula (IVe):

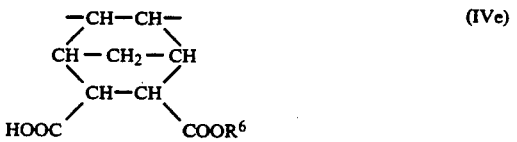
(IVe)

wherein $R^6$ is an alkyl group having 1 to 12 carbon atoms.

These units (IVa) to (IVe) can be obtained by copolymerizing, for example, the following monomers. In the formulas the symbols l, $R^5$, $R^6$, m and n are as defined above.

Unit (IVa)

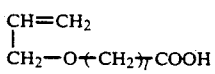
(IVa-1)

Examples of the monomer (IVa-1) are, for instance, 3-allyloxypropionic acid, allyloxybutyric acid, allyloxyvaleric acid, and the like.

Unit (IVb)

$$\begin{array}{c} R^2 \\ | \\ CH=CH \\ | \\ COOH \end{array}$$ (IVb-1)

Examples of the monomer (IVb-1) are, for instance, crotonic acid, 2-pentenoic acid, 2-hexenoic acid, and the like.

Unit (IVc)

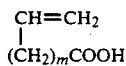
(IVc-1)

Examples of the monomer (IVc-1) are, for instance, vinylpropionic acid, 5-hexenoic acid, undecylenic acid, and the like.

Unit (IVd)

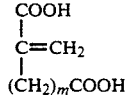
(IVd-1)

Examples of the monomer (IVd-1) are, for instance, itaconic acid, 2-methyleneglutaric acid, 2-methyleneadipic acid, and the like.

Unit (IVe)

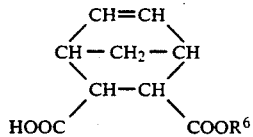
(IVe-1)

Examples of the monomer (IVe-1) are, for instance, a monoalkyl ester of Diels-Alder reaction product of cyclopentadiene and maleic acid anhydride, preferably $R^6$ being methyl, ethyl, propyl, n-butyl, isobutyl, t-butyl, and the like.

The carboxyl group in the monomers (IVa-1) to (IVe-1) may be free acid or neutralized with ammonia or a tertiary amine.

The copolymer of the present invention is the fluorine-containing copolymer prepared by copolymerizing those monomers and having a number average molecualr weight of 5000 to 50000, preferably 10000 to 40000 and a molecular weight distribution of 2 to 10, preferably 2.5 to 8, most preferably 3 to 6. When the molecular weight is less than 5000, the copolymer is inferior in weatherability and chemical resistance, and when more than 50000 a viscosity at coating operation is high to lower the smoothness of electrodeposition coating film. In addition, when the molecular weight distribution is less than 2, the water spot tends to be produced in case of low average molecular weight, and in case of high average molecular weight the levelling property becomes lowered. When the distribution is more than 10, the water spot tends to be produced, the amount of dewetting becomes large, and further the smoothness of baked coating film becomes lowered.

The preferred preparation of the copolymer of the invention can be carried out by copolymerization in a hydrophilic medium at a temperature of $-20°$ to $150°$ C., preferably $5°$ to $90°$ C., under a pressure of 0 to 30 kg/cm$^2$G, preferably 0 to 10 kg/cm$^2$G in the presence of a polymerization initiator.

Examples of the hydrophilic medium are, for instance, a ketone such as acetone, methyl ethyl ketone, cyclohexanone or dioxane; an alcohol such as methanol, ethanol, isopropanol, t-butanol, n-butanol, dimethylcarbitol, methyl cellosolve or ethyl cellosolve; an ether such as tetrahydrofuran, monoglyme or diglyme; an amide such as dimethylformamido or dimethylacetamide; an acetate such as methylcellosolve acetate or ethylcellosolve acetate; and an admixture thereof. The molecular weight and the molecular weight distribution may be controlled by regulating a composition of these hydrophilic media.

Examples of the polymerization initiator are, for instance, a peroxide such as diisopropyl peroxydicarbonate, t-butyl peroxybutyrate, benzoyl peroxide or lauryl peroxide; an azo compound such as azobisisobutyronitrile or azobisvaleronitrile. An amount of the initiator is 0.01 to 5 parts by weight, preferably 0.05 to 1.0 part by weight based on 100 parts by weight of a total monomer weight.

During the copolymerization reaction, hydrogen fluoride may be removed from the reaction product to lower a pH of the reaction system, and then the hydroxyl group and the vinyl group in the hydroxyalkyl vinyl ether of the formula (IIIa) are intermolecularly reacted to form a ring. In order to avoid such a reaction, it is preferred to add a pH controlling agent in an amount of 0.1 to 5 parts by weight based on 100 parts by weight of a total monomer weight. Examples of the pH controlling agent are, for instance, ammonia or a lower tertiary amine such as triethylamine, diethylpropylamine, dimethylethanolamine or triethanolamine. When the monomer (IVa-1) to (IVe-1) is partially neutralized, the amount of the pH controlling agent may be reduced or may not be used.

The molecular weight or its distribution can be regulated by adjusting a composition of the hydrophilic mixed solvent, by selecting a polymerization process, i.e. batch process, semi-batch process or continuous process, or by combining those methods. A preferred embodiment is a method that the copolymerization is carried out in an acetone mixed solvent containing an alcoholic solvent in an amount of not more than 30% by weight by means of a semi-batch method, a continuous method or a method combined thereof. The copolymerization conditions are not restricted to the above conditions.

The neutralization of carboxyl group can be carried out by adding a neutralizing agent to the reaction product after the completion of the copolymerization. As the neutralizing agent, there can be employed, in addition to the pH controlling agent, a higher tertiary amine such as N-methylpyrrolidine, N-methylpiperidine or N,N-dimethylbenzylamine, or a mixture thereof. The neutralizing agent may be used so that the carboxyl group can be neutralized in an amount of not less than 30% by mole. When the monomers (IVa-1) to (IVe-1) are neutralized, the amount of neutralizing agent is adjusted to a reduced amount.

The present invention is also relating to the paint composition comprising the fluorine-containing copolymer (A) and a hydrophilic medium (B).

As the hydrophilic medium (B), there can be used the above-mentioned hydrophilic solvent used as the reaction medium for the copolymer (A), preferably an alcoholic medium.

When preparing an aqueous paint for electrodeposition coating by using the composition of the invention, the fluorine-containing copolymer (A) which is dispersed or dissolved in the hydrophilic medium and a curing agent are dispersed or dissolved in an aqueous medium.

As the aqueous medium, there can be used water alone or a mixed medium of water and the hydrophilic medium. Preferred examples are, for instance, a mixed medium of water with an alcohol such as methanol, ethanol, isopropanol, t-butanol, n-butanol, methyl cellosolve, ethyl cellosolve, isopropyl cellosolve, butyl cellosolve, dimethylcarbitol, diethylcarbitol or dibutylcarbitol. A weight ratio of water/alcohol is generally 1/1 to 99.9/0.1, preferably 8/2 to 99/1. A concentration of the copolymer is 1 to 50% by weight, preferably 3 to 30% by weight.

To the composition of the present invention may be added a curing agent or other additives usually blended for paints.

As the curing agent, there may be used a curing agent which is not inhibited in its curing effect at a temperature of not more than 50° C. by the hydrophilic medium, particularly the alcoholic medium and, after the evaporation of the medium, reacts with the hydroxyl group and/or carboxyl group of the fluorine-containing copolymer (A), or reacts at a temperature of not less than 100° C. to crosslink the copolymer. An equivalent amount of the curing agent is 0.2 to 4, preferably 0.5 to 2.5 to a total amount of hydroxyl group and carboxyl group (including the neutralized group). An excess amount of the agent makes the weatherability of coating film lower. In case of a smaller amount, the hardness of the coating film becomes lowered. Examples of the curing agent are, for instance, a blocked isocyanate prepared by reacting a poly-isocyanate such as hexamethylene diisocyanate trimer, isophorone diisocyanate, bis(isocyanatomethyl)cyclohexane, dicyclohexylmethane diisocyanate, 1,4-diisocyanate cyclohexane or isocyanatomethylcyclohexyl isocyanate with one or more of phenol, ε-caprolactam, diethyl malonate and ethyl acetoacetate; a melamine resin such as methylated melamine, methyloled melamine or butyroled melamine; methylated urea resin; butylated urea resin; and the like. Particularly there can be preferably used an alkoxymethylated melamine resin of a methyl ether type or a mixed ether type which contains an alcohol of 1 to 4 carbon atoms.

Other additives conventionally used for paints such as pigments, dyes, UV absorbers, anti-skinning agents and flatting agents may be used.

The paint composition of the invention is particularly suitable for electrodeposition coating, and can also be used for spray coating, electrostatic coating, roll coating and curtain flow coating. The composition is applicable, as an anti-corrosive paint or an anti-static paint, to an aluminum sash, a roofing tile, a colored steel plate and a metallic can, tank or pipe as well as to a concrete product.

The electrodeposition coating procedures can be conducted by the usual method and conditions. For example, the coating may be usually carried out under the conditions; bath temperature of 10° to 40° C. (preferably 15° to 30° C.), electric voltage of 50 to 500 V (preferably 100 to 300 V), distance between the electrodes of 1 to 100 cm (preferably 10 to 50 cm), time of 0.5 to 10 minutes (preferably 1 to 5 minutes).

After the completion of the electrodeposition, the electrodeposited article is washed with water if necessary, and then is heated at a temperature of 150° to 200° C. for 5 to 60 minutes to cure the coating. When the used substrate is heat resistive, the coated article may be heated to about 300° C.

The thickness of the coating films is usually from 2 to 50 $\mu$m, preferably from 5 to 30 $\mu$m. When the film thickness is too thick, the cost is expensive, the smoothness is poor and bubbles are easily formed on the film, which results in generation of film defects. On the other hand, when the film thickness is too thin, it is easy to produce pin holes and blisters.

The articles to be coated (substrates) are not limited so long as they are electrically conductive. When aluminum or an aluminum alloy is used as the substrate, the obtained film is excellent in the weatherability, the stain resistance and the corrosion resistance, and is uniform and smooth.

The fluorine-containing polymer for paints and the paint composition of the present invention are more specifically described and explained by means of the following Preparation Examples, Examples and Comparative Examples. It is to be understood that the present invention is not limited to the Examples.

PREPARATION EXAMPLE 1

A 1000 ml glass autoclave was charged with 120 g of acetone, 15 g of ethanol and 3 g of triethylamine. After substituting the cavity with nitrogen gas, 167 g of CTFE was added and then heated to 65° C. An inner pressure when the temperature was stable was 9.1 kg/cm$^2$G.

Subsequently, the autoclave was continuously charged with a mixture of 61 g of ethyl vinyl ether (EVE), 37 g of hydroxybutyl vinyl ether (HBVE), 35 g of 3-allyloxypropionic acid (AOPrA), 3 g of azobisisobutyronitrile and 24 g of acetone over 3 hours to initiate the polymerization, and then the reaction system was maintained at the same temperature for 17 hours. An inner pressure of the autoclave after 17 hours was 3.6 kg/cm$^2$G.

The unreacted CTFE was removed from the reaction product to obtain 415 g of a varnish containing a volatile component in an amount of 60% by weight.

A molecular weight of the fluorine-containing copolymer in the varnish was measured by means of GPC (HLC8020 of Toso Co., Ltd.; column of Toso TSK gel GMH$_{XL}$ ×3+G2500H$_{XL}$; temperature of 40° C.). The number average molecular weight ($\overline{Mn}$) was 22000 (calculation based on polystyrene, hereinafter the same), and the molecular weight distribution (weight average molecular weight ($\overline{Mw}$)/($\overline{Mn}$)) was 4.1.

The fluorine-containing copolymer obtained by washing and drying the varnish was measured by means of $^{13}$CNMR, the copolymer consisted of 52% by mole of CTFE, 31% by mole of EVE, 9% by mole of HBVE and 8% by mole of AOPrA.

PREPARATION EXAMPLES 2 TO 14

The same procedures as in Preparation Example 1 were repeated except that the monomers, charging time and amount of ethanol shown in Table 1 were used to obtain a fluorine-containing copolymer.

The molecular weight and the molecular weight distribution of the resultant fluorine-containing copolymer are shown in Table 1.

COMPARATIVE PREPARATION EXAMPLE 1

The same monomers as in Preparation Example 1 were charged batchwise to obtain a fluorine-containing copolymer having a molecualr weight ($\overline{Mn}$) of 35000 and a molecular weight distribution of 14.

COMPARATIVE PREPARATION EXAMPLE 2

The same procedures as in Preparation Example 2 were repeated except that the charging time and the amount of ethanol were 6 hours and 24 g, respectively. The obtained fluorine-containing copolymer had a molecular weight ($\overline{Mn}$) of 16000 and a molecular weight distribution of 1.95.

COMPARATIVE PREPARATION EXAMPLE 3

The copolymer of Comparative Preparation Example 2 was treated with a mixed solvent of acetone/cyclohexane (½ weight ratio) to remove a lower molecular weight portion. The resultant fluorine-containing copolymer had a molecular weight ($\overline{Mn}$) of 23500 and a molecular weight distribution of 1.7.

The symbols described in Table 1 represent the following compounds.
CA: Crotonic acid
VPA: Vinylpropionic acid
UA: Undecylenic acid
IA: Itaconic acid
HACOEt: Monoethyl ester of Himic acid (Himic acid is a trade name and is a Diels-Alder reaction product of cyclopentadiene and maleic acid anhydride available from Hitachi Chemical Co., Ltd.)
PV: Vinyl pivalate
CHV: Vinyl cyclohexanecarboxylate
BVE: Butyl vinyl ether

TABLE 1

| Prep. Ex. | Monomer Kind | Charged amount (g) | Percentage of copolymer component (% by mole) | Condition Charging time (hr) | Amount of ethanol (g) | $\overline{Mn}$ | $\overline{Mw}/\overline{Mn}$ |
|---|---|---|---|---|---|---|---|
| 1 | CTFE | 167 | 52 | 3 | 15 | 22000 | 4.1 |
|   | EVE | 61 | 31 |   |   |   |   |
|   | HBVE | 37 | 9 |   |   |   |   |
|   | AOPrA | 35 | 8 |   |   |   |   |
| 2 | CTFE | 174.3 | 47 | 3 | 15 | 20000 | 4.5 |
|   | EVE | 65.4 | 35 |   |   |   |   |
|   | HBVE | 37.2 | 10 |   |   |   |   |
|   | CA | 23.1 | 8 |   |   |   |   |
| 3 | CTFE | 174 | 48 | 3 | 15 | 17000 | 3.5 |
|   | EVE | 65.3 | 34 |   |   |   |   |
|   | HBVE | 37.2 | 10 |   |   |   |   |
|   | VPA | 26.9 | 8 |   |   |   |   |
| 4 | CTFE | 158 | 50 | 3 | 15 | 17500 | 3.8 |
|   | EVE | 55.5 | 31 |   |   |   |   |
|   | HBVE | 37.2 | 11 |   |   |   |   |
|   | UA | 49.2 | 8 |   |   |   |   |
| 5 | CTFE | 154 | 45 | 3 | 15 | 18000 | 3.0 |
|   | EVE | 52.8 | 41 |   |   |   |   |
|   | HBVE | 37.2 | 10 |   |   |   |   |
|   | IA | 56.1 | 4 |   |   |   |   |
| 6 | CTFE | 153.9 | 45 | 3 | 15 | 15000 | 3.4 |
|   | EVE | 52.8 | 36 |   |   |   |   |
|   | HBVE | 37.2 | 11 |   |   |   |   |
|   | HACOEt | 56.1 | 8 |   |   |   |   |
| 7 | CTFE | 150.6 | 41 | 3 | 15 | 25000 | 4.8 |
|   | EVE | 89.1 | 41 |   |   |   |   |
|   | HBVE | 37.2 | 10 |   |   |   |   |
|   | CA | 23.1 | 8 |   |   |   |   |
| 8 | CTFE | 167 | 50 | 2.5 | 13 | 36000 | 6.1 |
|   | EVE | 61 | 31 |   |   |   |   |
|   | HBVE | 37 | 11 |   |   |   |   |
|   | AOPrA | 35 | 8 |   |   |   |   |
| 9 | CTFE | 174.9 | 47 | 3 | 15 | 18000 | 4.0 |
|   | EVE | 69.6 | 38 |   |   |   |   |
|   | HBVE | 37.2 | 9 |   |   |   |   |
|   | CA | 18.3 | 6 |   |   |   |   |
| 10 | CTFE | 173.1 | 45 | 3 | 15 | 21000 | 4.2 |
|   | EVE | 52.8 | 31 |   |   |   |   |
|   | HBVE | 37.2 | 10 |   |   |   |   |
|   | CA | 36.9 | 14 |   |   |   |   |
| 11 | CTFE | 135.3 | 51 | 3 | 15 | 21000 | 4.0 |
|   | PV | 66.9 | 21 |   |   |   |   |
|   | HBVE | 49.6 | 19 |   |   |   |   |
|   | CA | 18.4 | 9 |   |   |   |   |
| 12 | TFE | 118.2 | 50 | 3 | 15 | 19000 | 3.2 |
|   | CHV | 91.5 | 26 |   |   |   |   |
|   | HBVE | 37.2 | 14 |   |   |   |   |
|   | CA | 23.1 | 10 |   |   |   |   |
| 13 | HFP | 190 | 45 | 3 | 15 | 18000 | 3.0 |

TABLE 1-continued

| Prep. Ex. | Monomer Kind | Charged amount (g) | Percentage of copolymer component (% by mole) | Condition Charging time (hr) | Amount of ethanol (g) | $\overline{Mn}$ | $\overline{Mw}/\overline{Mn}$ |
|---|---|---|---|---|---|---|---|
|  | EVE | 49 | 33 |  |  |  |  |
|  | HBVE | 37 | 12 |  |  |  |  |
|  | CA | 23 | 7 |  |  |  |  |
| 14 | CTFE | 115 | 35 | 3 | 15 | 22000 | 4.0 |
|  | BVE | 98 | 35 |  |  |  |  |
|  | HBVE | 50 | 15 |  |  |  |  |
|  | CA | 37 | 15 |  |  |  |  |

EXAMPLE 1

A varnish with a concentration of 65% by weight was prepared by dissolving the fluorine-containing copolymer obtained in Preparation Example 1 in isopropanol. 100 Parts by weight of the varnish was neutralized with 4.6 parts by weight (0.9 equivalent amount to carboxyl group) of triethylamine (neutralization degree: 90%). To 100 parts by weight of the neutralized varnish were added 20 parts by weight of 80% methyloled melamine resin (Melan 620 available from Hitachi Chemical Co., Ltd.; solid content: 70% by weight) and 10 parts by weight of butyl cellosolve. The resultant mixture was agitated to homogeneous state. The solid content of the mixture was then adjusted to 7% by weight by adding 990 parts by weight of deionized water to obtain a paint composition for electrodeposition coating.

The obtained composition was placed in an electrocoating bath and was coated onto an alumite-treated aluminum alloy plate as anode (6063S aluminum alloy plate having a 9 μm thick anodic oxidation coating subjected to sealing) by applying an electric current to the bath at a bath temperature of 22° C. and a voltage of 140 V for 3 minutes. The coated plate was washed with water, and was baked and cured at 180° C. for 30 minutes.

With respect to the thus obtained film, the following properties were measured. The results are shown in Table 2.

Film Thickness

The thickness (μm) is measured by using a film thickness meter ("PERMASCOPE EW" made by Kabushiki Kaisha Kett Kagaku Kenkyusho).

Gloss

The 60° specular gloss (%) is measured by using a glossmeter ("VG-2PD" made by Nippon Denshoku Kogyo Kabushiki Kaisha).

Weatherability

The accelerated weathering test is made for 360 hours using a Weather-O-Meter (made by Suga Shikenki Kabushiki Kaisha) under conditions: dew cycle, irradiation/darkness=60 min./60 min.; black panel temperature 63° C. The gloss retention rate (%) is measured.

Adhesion To Substrate

The coating film is cross-cut by a knife into 100 squares each having a size of 1×1 mm, and a cellophane adhesive tape is repeatedly stuck and peeled off 10 times. The number of remaining squares is counted.

Alkali Resistance

The film is dipped in a 5% aqueous solution of sodium hydroxide for 72 hours. The appearance of the film is observed with the naked eyes as to whether blisters are produced or not.

Smoothness

The appearance of the film is observed with the naked eyes with respect to the presence of pinholes and unevenness.

Pencil hardness

The pencil hardness is measured according to Japanese Industrial Standard (JIS) H 5400.

Boiling Water Resistance

The boiling water resistance is measured according to JIS H 8602.

Appearance (Water Spotting, Dewetting)

The appearance is observed with naked eyes. A: None, B: Produced 1 to 2 spots, C: Produced 3 to 4 spots, D: Produced 5 spots or more

EXAMPLES 2 TO 14

The same electrodeposition and baking procedures as in Example 1 were repeated except that the fluorine-containing copolymer obtained in Preparation Examples 2 to 14 was employed to obtain a coating film.

With respect to each film, the properties were measured in the same manner as in Example 1. The results are shown in Table 2.

COMPARATIVE EXAMPLES 1 TO 3

The same electrodeposition and baking procedures as in Example 1 were repeated except that the fluorine-containing copolymer obtained in Comparative Preparation Examples 1 to 3 was employed to obtain a film.

With respect to each film, the properties were measured in the same manner as in Example 1. The results are shown in Table 2.

TABLE 2

| Tested Items | Example 1 | 2 | 3 | 4 | 5 | 6 | 7 | 8 | 9 | 10 | 11 | 12 | 13 | 14 | Comparative Example 1 | 2 | 3 |
|---|---|---|---|---|---|---|---|---|---|---|---|---|---|---|---|---|---|
| Film thickness (μm) | 12 | 10 | 11 | 9 | 12 | 12 | 14 | 10 | 11 | 12 | 13 | 13 | 12 | 11 | 11 | 12 | 11 |
| Gloss (%) | 76 | 82 | 80 | 79 | 83 | 83 | 84 | 80 | 82 | 82 | 80 | 75 | 79 | 80 | 74 | 78 | 76 |
| Smoothness | Good | ← | ← | ← | ← | ← | ← | ← | ← | ← | ← | Good | ← | ← | Good other than dewetting part | Good | ← |

TABLE 2-continued

| Tested Items | Example 1 | 2 | 3 | 4 | 5 | 6 | 7 | 8 | 9 | 10 | 11 | 12 | 13 | 14 | Comparative Example 1 | 2 | 3 |
|---|---|---|---|---|---|---|---|---|---|---|---|---|---|---|---|---|---|
| Pencil hardness | 3H | 4H | 4H | 4H | 2H | 3H | 2H | 3H | 2H | 4H | 3H | 2H | 3H | 2H | 3H | 4H | 4H |
| Adhesion | 100 | ← | ← | ← | ← | ← | ← | ← | ← | ← | ← | 100 | ← | ← | 100 | ← | ← |
| Weatherability (%) | 82 | 80 | 75 | 80 | 70 | 75 | 80 | 82 | 78 | 75 | 81 | 82 | 76 | 77 | 65 | 79 | 78 |
| Alkali resistance | Not changed | ← | ← | ← | ← | ← | ← | ← | ← | ← | ← | Not changed | ← | ← | Blisters were produced on the dewetting part | Not changed | ← |
| Boiling water resistance | Not changed | ← | ← | ← | ← | ← | ← | ← | ← | ← | ← | Not changed | ← | ← | Partially whitened | Not changed | ← |
| Appearance (Water spotting, dewetting) | A | ← | ← | ← | ← | ← | ← | ← | ← | ← | ← | A | ← | ← | D (dewetted and presence of water spots) | C (Water spots) | D (Water spots) |

What We claim is:

1. A water dispersible fluorine-containing copolymer having a number average molecular weight of 5000 to 50000 and a molecular weight distribution represented by a value of weight average molecular weight/number average molecular weight of 2 to 10, which consists essentially of a unit of the formula (I):

$$-CFX-CF_2-  \quad (I)$$

wherein X is chlorine atom, fluorine atom or trifluoromethyl, in an amount of 30 to 70% by mole, a unit of the formula (II):

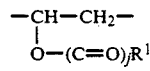

$$\begin{array}{c} -CH-CH_2- \\ | \\ O-(C=O)_jR^1 \end{array} \quad (II)$$

wherein $R^1$ is an alkyl group having 1 to 12 carbon atoms, a monovalent alicyclic group having 4 to 10 carbon atoms or a fluoroalkyl group having 2 to 10 carbon atoms, and j is 0 or 1, in an amount of 15 to 45% by mole, a unit of the formula (III):

$$\begin{array}{c} -CH-CH_2- \\ | \\ O(CH_2)_kOH \end{array} \quad (III)$$

wherein k is an integer of 2 to 6, in an amount of 1 to 30% by mole, and a unit of the formula (IV):

$$\begin{array}{c} R^2 \\ | \\ -C-CH- \\ |\quad | \\ R^3\ R^4 \end{array} \quad (IV)$$

wherein $R^2$, $R^3$ and $R^4$ are the same or different and each is hydrogen atom or a carboxyl-containing organic residue without an ester moiety, provided that at least one of $R^2$, $R^3$ and $R^4$ contains a carboxyl group, and not less than 30% of the carboxyl group is neutralized with ammonia or a tertiary amine, and $R^3$ and $R^4$ may be combined together to form a ring, in an amount of 4 to 30% by mole; a total % by mole of the units (I), (II), (III) and (IV) is 100.

2. The polymer of claim 1, wherein the unit (IV) is at least one of the unit (IVa):

$$\begin{array}{c} -CH-CH_2- \\ | \\ CH_2-O(CH_2)_lCOOH \end{array} \quad (IVa)$$

wherein l is an integer of 1 to 6, the unit (IVb):

$$\begin{array}{c} R^5 \\ | \\ -CH-CH- \\ | \\ COOH \end{array} \quad (IVb)$$

wherein $R^5$ is an alkyl group having 1 to 8 carbon atoms, the unit (IVc):

$$\begin{array}{c} -CH-CH_2- \\ | \\ (CH_2)_mCOOH \end{array} \quad (IVc)$$

wherein m is an integer of 1 to 12, the unit (IVd):

$$\begin{array}{c} COOH \\ | \\ -C-CH_2- \\ | \\ (CH_2)_nCOOH \end{array} \quad (IVd)$$

wherein n is an integer of 1 to 4, or the unit (IVe):

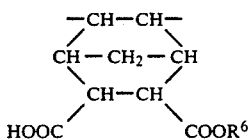

$$(IVe)$$

wherein $R^6$ is an alkyl group having 1 to 12 carbon atoms.

3. A fluorine-containing composition for aqueous paints, comprising
(A) a fluorine-containing copolymer having a number average molecular weight of 5000 to 50000 and a molecular weight distribution represented by a value of weight average molecular weight/number average molecular weight of 2 to 10, which consists essentially of a unit of the formula (I):

$$-CFX-CF_2-  \quad (I)$$

wherein X is chlorine atom, fluorine atom or trifluoromethyl, in an amount of 30 to 70% by mole, a unit of the formula (II):

$$\begin{array}{c} -CH-CH_2- \\ | \\ O-(C=O)_jR^1 \end{array} \quad (II)$$

wherein $R^1$ is an alkyl group having 1 to 12 carbon atoms, a monovalent alicyclic group having 4 to 10 carbon atoms or a fluoroalkyl group having 2 to 10 carbon atoms, and j is 0 or 1, in an amount of 15 to 45% by mole, a unit of the formula (III):

$$-CH-CH_2- \quad (III)$$
$$\phantom{-CH-}| $$
$$\phantom{-CH-}O(CH_2)_kOH$$

wherein k is an integer of 2 to 6, in an amount of 1 to 30% by mole, and a unit of the formula (IV):

$$\begin{array}{c} R^2 \\ | \\ -C-CH- \\ | \phantom{-}| \\ R^3 \phantom{-}R^4 \end{array} \quad (IV)$$

wherein $R^2$, $R^3$ and $R^4$ are the same or different and each is hydrogen atom or a carboxyl-containing organic residue without an ester moiety, provided that at least one of $R^2$, $R^3$ and $R^4$ contains a carboxyl group, and not less than 30% of the carboxyl group is neutralized with ammonia or a tertiary amine, and $R^3$ and $R^4$ may be combined together to form a ring, in an amount of 4 to 30% by mole; a total % by mole of the units (I), (II), (III) and (IV) is 100, and (B) a curing agent.

4. The composition of claim 3, wherein the unit (IV) is at least one of the unit (IVa):

$$-CH-CH_2- \quad (IVa)$$
$$\phantom{-}| $$
$$CH_2-O(CH_2)_l COOH$$

wherein l is an integer of 1 to 6, the unit (IVb):

$$\begin{array}{c} R^5 \\ | \\ -CH-CH- \\ | \\ COOH \end{array} \quad (IVb)$$

wherein $R^5$ is an alkyl group having 1 to 8 carbon atoms, the unit (IVc):

$$-CH-CH_2- \quad (IVc)$$
$$\phantom{-}| $$
$$(CH_2)_m COOH$$

wherein m is an integer of 1 to 12, the unit (IVd):

$$\begin{array}{c} COOH \\ | \\ -C-CH_2- \\ | \\ (CH_2)_n COOH \end{array} \quad (IVd)$$

wherein n is an integer of 1 to 4, or the unit (IVe):

$$\begin{array}{c} -CH-CH- \\ /\phantom{CH_2}\backslash \\ CH-CH_2-CH \\ \backslash\phantom{CH_2}/ \\ CH-CH \\ /\phantom{CH_2}\backslash \\ HOOC \phantom{CH_2} COOR^6 \end{array} \quad (IVe)$$

wherein $R^6$ is an alkyl group having 1 to 12 carbon atoms.

5. The composition of claim 3 or 4, wherein the composition is a paint composition for electrodeposition coating, further comprising an alcoholic medium and water, wherein the curing agent is an agent having a curing effect which is not inhibited by the medium.

* * * * *